March 3, 1964   E. A. MALOOF   3,123,119
SPRING-LOCK NUT AND BOLT ASSEMBLY
Filed May 7, 1959   2 Sheets-Sheet 1
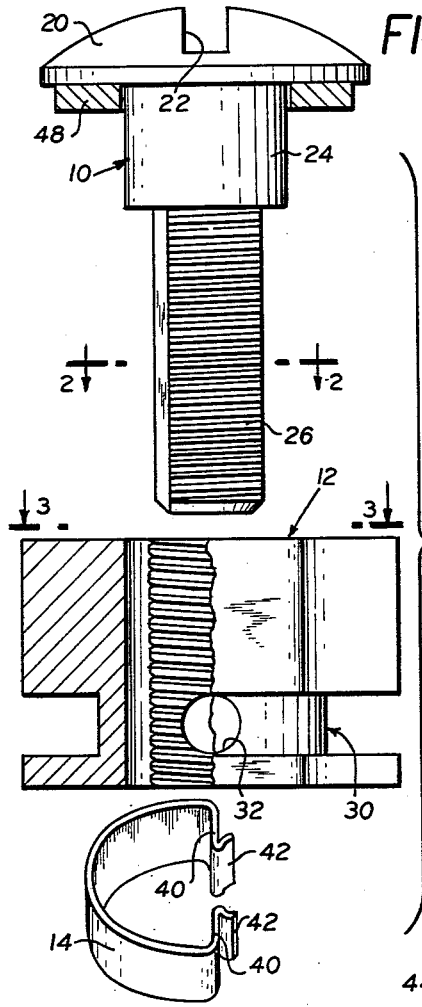
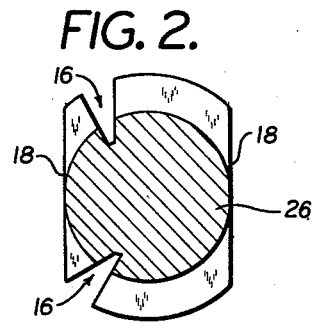
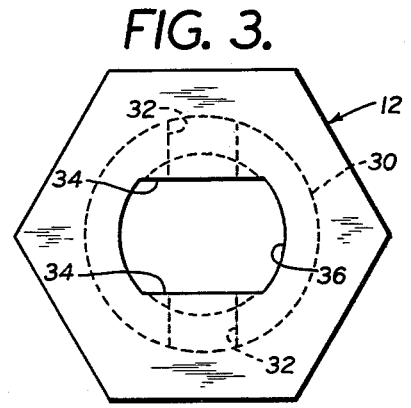
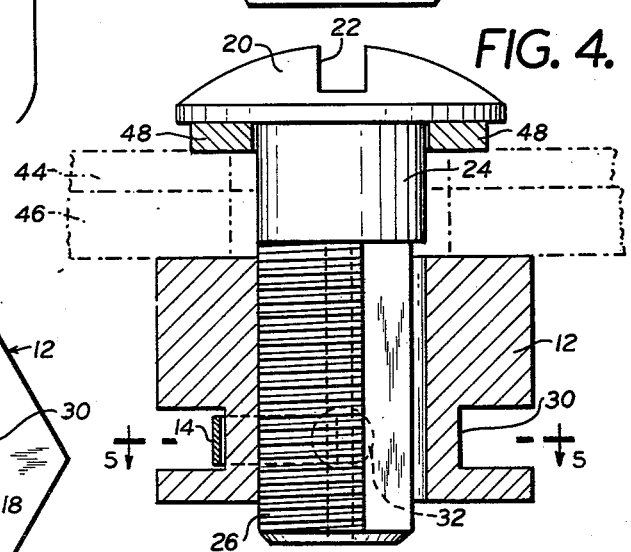
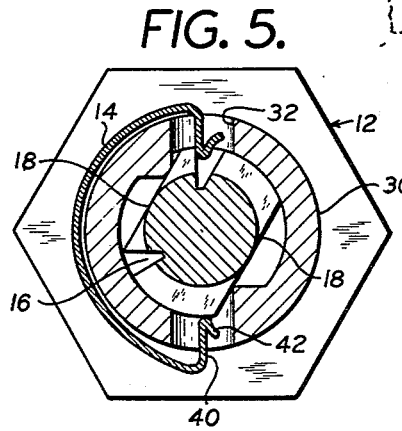
INVENTOR
EMILE A. MALOOF
BY
ATTORNEY March 3, 1964  E. A. MALOOF  3,123,119

SPRING-LOCK NUT AND BOLT ASSEMBLY

Filed May 7, 1959  2 Sheets-Sheet 2

INVENTOR
EMILE A. MALOOF
BY
*Samuel J. Stree*
ATTORNEY

United States Patent Office 3,123,119
Patented Mar. 3, 1964

3,123,119
SPRING-LOCK NUT AND BOLT ASSEMBLY
Emile A. Maloof, 420 Central Park W., Apt. 5-B, New York, N.Y.
Filed May 7, 1959, Ser. No. 811,679
2 Claims. (Cl. 151—11)

This invention relates to a spring-lock nut and bolt assembly.

It is well known that locking means for nut and bolt assemblies are essential in many applications and installations in which component parts are bolted together. This is especially true of fast moving vehicles, machines and components thereof. Vibrations and other forms of relative movement between the bolted parts tend to loosen the tightest bolts and the consequences are some times fraught with danger to life and limb, not to mention the vehicle or machine itself.

Many forms of locking devices have been proposed, made and used. In some cases the locking feature per se has been found adequate but other required features have been found to be wanting. For example, the use of a cotter pin to lock a nut to a bolt has proved highly satisfactory for this purpose. However, this type of locking device does not permit of fine adjustments between the nut and bolt on the one hand and the work on the other hand. Moreover, each specific application or installation would require a specially designed bolt having a specially placed cotter-receiving hole. Aside from this disadvantage is the fact that removing and replacing the bolt or loosening and tightening it becomes a major operation which is both time consuming and costly and requires special tools to manipulate the cotter pin and may also require replacement cotter pins. This type of locking device is cited by way of illustration to indicate the various requirements which are essential to a nut and bolt locking element. In some instances, one such requirement is adequately met but the others are not. In other cases another requirement is met but the remaining requirements are not.

It is the principal object of this invention to provide a spring-lock nut and bolt assembly which meets all of the requirements of such device and which suffers from none of the defects and disadvantages of prior devices of like general nature. Specifically, the present device is structurally, mechanically and functionally sound. It may be adjusted or modified dimensionally or as to form and in many other respects so as to be adapted for any and all applications and installations in which self-locking fasteners are required.

The essential principle of this device resides in the fact that there is no significant stress upon the locking element. Briefly stated, the present device comprises a nut and bolt assembly which is coupled with a spring-locking element. All of the stress involved in the use of said device as a fastener is applied solely and exclusively to the nut and bolt assembly. The spring-locking element is not involved in the fastening action. All that it does is to provide a spring-urged lock between the nut and bolt to prevent relative angular movement between them except when it is desired to loosen or tighten the nut and bolt assembly or to remove the nut from the bolt or to replace it thereon.

The result is a nut and bolt fastener which is not sensitive to vibrations or other disruptive forces which would normally tend to cause relative angular movement between the nut and the bolt.

Essentially, the present device comprises the following elements: a bolt having at least one longitudinal groove formed in its shank across the screw threads, a nut adapted for threadedly engaging said bolt, and a spring mounted on said nut for engagement with said groove. These are the three essential elements of the present invention and each may be designed for the individual requirements of any of the applications or installations for which a self-locking fastener would be suited.

An important feature of the present invention is the fact that it is adapted to be interchangeable with conventional nuts and bolts. Thus, a conventional nut and bolt assembly may be removed from a given installation and the present spring-locking nut and bolt assembly may be substituted in its place and stead without any alteration or adapting feature in the work. Conversely, the present device may be removed from any given installation and a conventional nut and bolt assembly may be substituted therefor.

The present device is intended to be used in the same manner and with the same tools as a conventional nut and bolt assembly. Special tools or special handling are not required. The range of adjustment of the present device to take into account work pieces of various dimensions is precisely the same as is the case with a conventional nut and bolt assembly of corresponding size.

Another important feature of the invention resides in the fact that it may be made to lock at as many angular positions of the nut relative to the bolt as may be desired. For example, the nut may be made to lock relative to the bolt at two points, four points, six points or at any other number of points for each revolution of the nut on the bolt. In a preferred form of this invention ten locking positions are provided for each revolution of the nut relative to the bolt.

The present device may be made relatively slow-acting in the sense that a conventional nut and bolt assembly is slow-acting. It may however be made relatively fast-acting by providing bypassing means between the nut and the bolt to permit of relative longitudinal movement between them without requiring relative angular movement. This is accomplished by removal of corresponding longitudinal portions of the screw threads on the nut and bolt.

The invention is illustrated in the accompanying drawing in which:

FIG. 1 is an exploded view, partly broken away and in section, showing the three components of a spring-lock nut and bolt assembly made in accordance with one form of this invention, said assembly being of the quick-acting type.

FIG. 2 is a transverse section through the shank of the bolt taken on the line 2—2 of FIG. 1, said section being enlarged.

FIG. 3 is an end view of the nut looking in the direction of arrows 3, 3 of FIG. 1.

FIG. 4 is an assembled view of the components shown in FIG. 1, said view being partly in longitudinal section.

FIG. 5 is a transverse section on the line 5—5 of FIG. 4.

Figure 6:
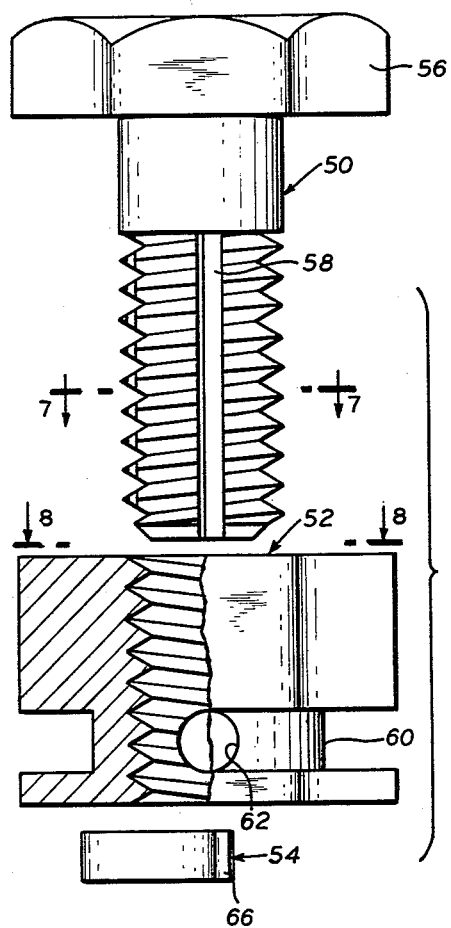
FIG. 6 is an exploded view, partly in longitudinal section, of the three components of a spring-lock nut and bolt assembly made in accordance with a second form of this invention.
Figure 7:
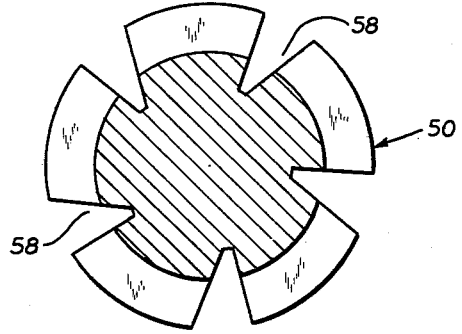
FIG. 7 is a transverse section in enlarged form through the shank of the bolt, said section being taken on the line 7—7 of FIG. 6
Figure 8:
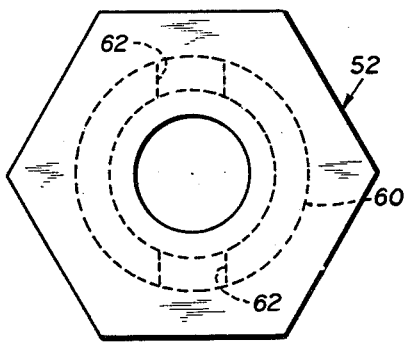
FIG. 8 is an end view of the nut, looking in the direction of arrows 8, 8 of FIG. 6.

Referring now in detail to the first form of the invention and to FIGS. 1 to 5 of the drawing, it will be observed that a quick-acting spring-lock nut and bolt assembly made in accordance with this invention comprises a bolt 10, a nut 12 and a locking spring 14. Bolt 10 may be conventional in every respect except for longitudinally extending grooves 16 and flat portions 18 which extend across its screw threads. It has a head 20 which may be provided with a screwdriver slot 22, an upper shank portion 24 which is unthreaded, and a lower shank portion 26 which is threaded. The relative lengths of the two shank portions are matters of design.

Nut 12 may also be of conventional design except for its annular groove 30, its diametrically aligned holes 32 and a pair of opposed flat portions 34 corresponding to flat portions 18 of the bolt. In the arcuate areas between said flat portions 34, smooth walls 36 are provided in said nut.

Spring 14 is generally arcuate in shape and provided with a pair of radially inwardly bent end portions or fingers 40 which are doubled over at their ends to form cam portions 42. As noted in the drawing, spring 14 is preferably a flat leaf type of spring and it is adapted to fit into annular groove 30 formed in the nut. Fingers 40 and their cam portions 42 project through holes 32 formed in said nut. The spring is thereby held in place on the nut and cannot be accidentally dislodged therefrom. The two fingers 40 prevent the spring from moving in either angular direction relative to the nut. However, the arcuate portion of the spring remains free to flex so as to permit radial movement of the fingers.

When bolt 10 and nut 12 are to be quickly assembled, the threaded shank of the bolt may be inserted axially into the nut, flat portions 18 of the bolt being disposed in parallel relation to flat portions 34 of the nut. When the bolt is inserted as far as it will go into the nut, it being understood that the work pieces 44 and 46 which are to be bolted together are disposed between the bolt head 20 and said nut, the bolt is turned relative to the nut an angular distance of approximately 90 degrees in order to cause the bolt threads 26 to engage the nut threads. The work pieces 44 and 46 are now firmly bolted together. In order to enable the bolt threads to locate the nut threads and to mesh with them, a relatively resilient washer 48 is placed between the bolt head and the adjacent work piece 44. This washer permits of just enough axial adjustment of the bolt relative to the nut to enable their respective threads to locate and mesh with each other.

I will now be seen that longitudinal locking grooves 16 in the shank of the bolt are not diametrically aligned with each other but that fingers 40 of the spring are. It will also be noted that the fingers are long enough to project through the wall of the nut in the area of its groove 30 into engagement with the bolt. As the bolt is rotated relative to the nut, one of the spring fingers 40 engages one of the longitudinal locking grooves 16 as shown, for example, in FIG. 5, while the opposite spring finger bears against the periphery of the bolt, creating the necessary tension to securely confine the first mentioned spring finger in the locking groove. This is sufficient to lock the bolt against angular movement relative to the nut and, of course, by the same token, the nut is locked against angular movement relative to the bolt. This would not preclude relative angular movement between the bolt and the nut when suitable tools are used, as for example a screwdriver applied to the bolt head and a wrench applied to the nut. The parts are locked against relative angular movement only to the extent that such movement might otherwise be caused by vibrations or other similar forces.

It is not essential that two longitudinal grooves 16 be provided. A single groove or a greater number of grooves than two would suffice for the purposes of this invention. The greater the number of grooves, the finer is the adjustment. This will become more apparent in connection with the description of the second form of this invention, wherein five grooves are provided in equally spaced relationship and this, coupled with the fact that the grooves are engageable by both ends of the spring clip, provides a total of ten locking positions between the bolt and the nut.

Referring once again to grooves 16, it will be observed that one wall of each groove closely approaches a diametric plane, whereas the other wall is inclined rather substantially to such plane. Reference to Fig. 5 will disclose that fingers 40 of the spring occupy a plane which is either diametric or parallel thereto. Consequently, the substantially diametric or radial wall of the groove shown at the upper end of FIG. 5 engages the corresponding finger 40 of the spring in substantially flat abutment therewith. As viewed in FIG. 5, it would be relatively difficult to turn the nut in counter-clockwise direction relative to the bolt because of such engagement between said finger and said diametric or radial wall of the groove. The cam-shaped portion 42 of said finger, engaging the more inclined wall of said groove at the upper end of FIG. 5, would present less of a problem in connection with the clockwise movement of the nut relative to the bolt. Conversely, when the spring finger 40 at the lower end of FIG. 5 is brought into engagement with the lower groove in the bolt, there is greater resistance in turning the nut in clockwise direction relative to the bolt than in turning it in counter-clockwise direction. The reason for this is not so much in the angular relationship of the walls of the grooves to adjacent diametric planes, although this is a factor as above indicated, but rather in the fact that the oppositely disposed cam portions 42 of fingers 40 engage the walls of the grooves when the nut is rotated in opposite directions relative to the bolt. Thus, when the nut is rotated in clockwise direction, as viewed in FIG. 5, the upper cam element 42 will facilitate such movement by camming itself out of the upper groove. However, it is only when the nut is rotated in counter-clockwise direction, as viewed in FIG. 5, that the cam element at the lower end of said figure will facilitate disengagement with the particular groove which it happens to encounter.

Turning now to the second form of this invention and to FIGS. 6 to 10, inclusive, it will be noted that the component parts thereof correspond to those of the first form of the invention and comprise a bolt 50, a nut 52 and a spring or spring clip. Bolt 50 resembles bolt 10 above described, except that it has a hexagonal head 56 in place of the slotted head 20, it is provided with five grooves 58 instead of only two grooves 16, and it has no flat portions corresponding to the flat portions 18 of the bolt above described. Basically, however, the two bolts are alike, since both are provided with a head and with a threaded shank and with a plurality of longitudinal grooves formed in said threaded shank.

Nut 52 resembles nut 12 in that it is provided with an annular groove 60 corresponding to groove 30 and a pair of aligned radial holes 62 corresponding to holes 32. However, the flat portions 34 and smooth arcuate walls 36 of nut 12 are missing in nut 52. In short, except for holes 62, the threads in nut 52 are unbroken. Spring 54 may be identical with spring 14 above described, and it may be provided with substantially radial fingers 64 having cam portions 66 at their inner ends.

Figure 10:
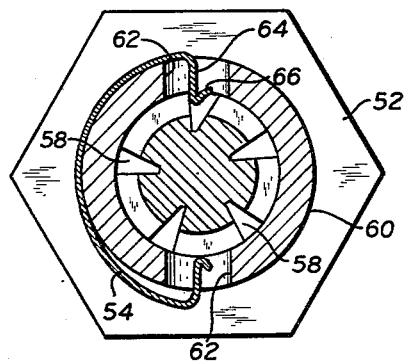
FIG. 10 is a transverse section on the line 10—10 of FIG. 9.
Figure 9:
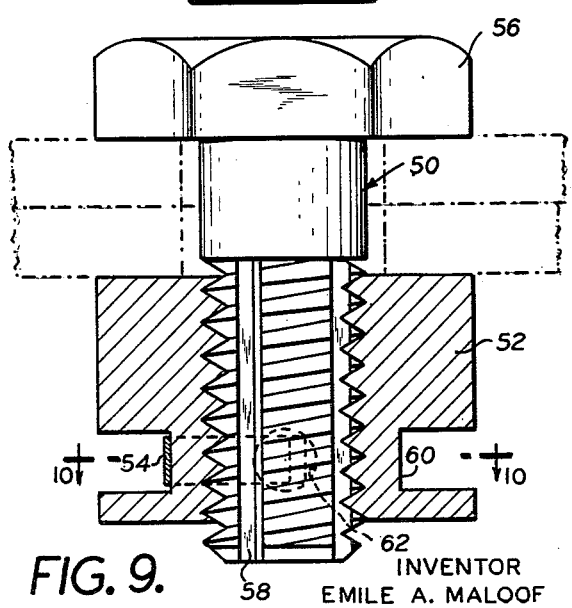
FIG. 9 is an assembled view of the components shown in FIG. 6, said view being partly in longitudinal section.

The spring-lock nut and bolt assembly shown in FIGS. 9 and 10 is used in the same way as the nut and bolt assembly first above described. The only difference resides in the fact that, whereas the first mentioned device may quickly be assembled and disassembled by moving the bolt axially relative to the nut (without rotating it at the same time), in the present form of the invention the bolt must be rotated relative to the nut if it is to move axially into or out of the nut. In short, the present device is utilized in precisely the same manner as a conventional nut and bolt assembly. The difference resides in the results and not in the method of operation. As each longitudinal groove 58 is engaged by one of the fingers of the spring clip, the nut and bolt are automatically spring-locked into engagement with each other. Accidental dislodgment of the nut relative to the bolt or vice versa is thereby prevented. The device remains free, however, for adjustment in either direction and also for disassembly by the use of conventional tools such as a wrench applied to the head of the bolt and a second wrench applied to the nut.

The foregoing is illustrative of preferred forms of the invention, and it will be understood that these forms may be modified and other forms may be provided within the broad principles of the invention and the broad scope of the claims.

I claim:

1. Nut and bolt assembly comprising: a bolt threaded along at least a portion of its length and having at least one longitudinal groove therealong, said groove being defined at least in part by two angular walls, the planes of which intersect, one of said walls defining a plane which is generally diametrical with respect to the bolt axis, while the other wall defines a plane which is angularly offset from said bolt axis a substantial distance, said groove being of a depth sufficient to extend radially inwardly of the root diameter of said threads, a nut having a cooperatively threaded opening therein for threaded engagement with said bolt threads; said nut having a peripheral groove and radial passages between said threaded opening and said peripheral groove; a generally arcuate spring carried in said peripheral groove and having inwardly extending locking fingers received within said passages and projecting within said threaded opening for biased engagement with said bolt, said radial passages being of a size substantially greater than the size of said arcuate spring to provide for transverse movement of the portions of said spring adjacent said locking fingers with respect to the axis of said bolt, said locking fingers being spaced in position to alternately engage said longitudinal groove, one finger at a time, each of the locking fingers of said arcuate spring being formed with a generally flat wall portion which is generally parallel to said diametrical groove wall which the locking finger engages, said locking finger also having a second wall portion angularly intersecting said first wall portion to form a resilient tapered cam portion positioned to angularly intersect said second wall of said groove, said first and second locking finger walls being defined by a generally V-shaped bend with the apex thereof being innermost, to thereby permit the nut to rotate in one rotary direction relative to the bolt while resisting but not completely preventing rotation in the opposite rotary direction relative to said bolt.

2. A spring-lock nut and bolt assembly in accordance with claim 1, wherein the bolt has a plurality of said longitudinal grooves and is provided, intermediate the lonigtudinal grooves, with a pair of flat portions extending longitudinally in parallel planes on diametrically opposite sides of the bolt, the threads of the bolt being interrupted by said flat portions, the nut being also provided with corresponding threads and flat portions formed in its central threaded opening, the arcuate portions between said flat portions in the nut being free of threads, the bolt being adapted to move axially through the nut when the flat portions of said bolt and said nut are maintained in parallel relation to each other, thereby providing for quick adjustment of the nut relative to the bolt, said nut being engageable with the screw threads of the bolt when it is turned relative to the bolt an angular distance of less than 180 degrees.

References Cited in the file of this patent

UNITED STATES PATENTS

| 783,088 | Vaughan | Feb. 21, 1905 |
| 1,289,867 | Moore | Dec. 31, 1918 |
| 1,360,880 | Buchholtz | Nov. 30, 1920 |
| 2,380,240 | Hufferd | July 10, 1945 |
| 2,730,154 | Aspey | Jan. 10, 1956 |

FOREIGN PATENTS

| 1,155,930 | France | Dec. 9, 1957 |